United States Patent
Tan et al.

(10) Patent No.: US 12,271,684 B2
(45) Date of Patent: Apr. 8, 2025

(54) AUTOMATED VERIFICATION OF ANNOTATED SENSOR DATA

(71) Applicant: Motional AD LLC, Boston, MA (US)

(72) Inventors: Kok Seang Tan, Singapore (SG); Holger Caesar, Singapore (SG); Yiluan Guo, Singapore (SG); Oscar Beijbom, Santa Cruz, CA (US)

(73) Assignee: Motional AD LLC, Boston, MA (US)

( * ) Notice: Subject to any disclaimer, the term of this patent is extended or adjusted under 35 U.S.C. 154(b) by 498 days.

(21) Appl. No.: 17/450,362

(22) Filed: Oct. 8, 2021

(65) Prior Publication Data

US 2023/0115566 A1 Apr. 13, 2023

(51) Int. Cl.
*G06F 40/169* (2020.01)
*G06T 7/246* (2017.01)
*G06T 7/33* (2017.01)

(52) U.S. Cl.
CPC ............ *G06F 40/169* (2020.01); *G06T 7/251* (2017.01); *G06T 7/33* (2017.01)

(58) Field of Classification Search
CPC .... G06F 40/169; G06F 18/217; G06F 11/277; G06F 18/214–2155; G06F 7/023; G06F 40/16; G06V 30/1916; G06V 10/75; G06V 10/98; G06V 10/96; G06V 10/811; G06V 20/64; G06V 10/776; G06V 20/58; G06V 10/82; G06V 20/56; G06V 10/255; G06V 10/70; G06V 10/774–7796; G06T 7/251; G06T 7/33; G06T 7/174; G06T 5/50; G06T 7/55; G06T 2207/20081; G06T 2207/20084; G06K 9/6256; G06K 9/6257;

(Continued)

(56) References Cited

U.S. PATENT DOCUMENTS 10,621,495 B1 * 4/2020 Huval .................. G01S 17/931
11,074,456 B2 * 7/2021 Farre Guiu ............. G06T 7/60
(Continued)

FOREIGN PATENT DOCUMENTS

CN 111046190 A 4/2020
KR 10-2245896 B1 4/2021
(Continued)

OTHER PUBLICATIONS

Lang, A. et al., "PointPillars: Fast Encoders for Object Detection from Point Clouds", CVPR 2019, May 2019, arXiv:1812.05784v2, in 9 pages.

(Continued)

*Primary Examiner* — Manav Seth
(74) *Attorney, Agent, or Firm* — Knobbe, Martens, Olson & Bear, LLP

(57) ABSTRACT

Provided are methods for automated verification of annotated sensor data, which can include receiving annotated image data associated with an image, wherein the annotated image data comprises an annotation associated with an object within the image, determining an error with the annotation based at least in part on a comparison of the annotation with annotation criteria data associated with criteria for at least one annotation, determining a priority level of the error, and routing the annotation to a destination based at least in part on the priority level of the error. Systems and computer program products are also provided.

20 Claims, 8 Drawing Sheets

(58) Field of Classification Search
CPC .......... G06K 9/6259; G06N 3/02–126; G06N 20/00–20; G06N 3/08; G06N 3/045; G06N 3/0464; G06N 3/09; G06N 5/022; B60W 2050/146; B60W 2050/0005; B60W 50/14; B60W 2555/60; B60W 60/001; B60W 2420/403; B60W 2420/408; B60W 2554/4029
See application file for complete search history.

(56) References Cited

U.S. PATENT DOCUMENTS

| | | | | |
|---|---|---|---|---|
| 2008/0288857 | A1* | 11/2008 | Duncan | G06T 11/60 715/230 |
| 2009/0281726 | A1* | 11/2009 | Byrne | G01C 21/34 701/533 |
| 2015/0220567 | A1* | 8/2015 | Folkens | G06V 10/7784 382/203 |
| 2015/0220569 | A1 | 8/2015 | Folkens et al. | |
| 2019/0034831 | A1* | 1/2019 | Perona | G06F 16/285 |
| 2020/0151459 | A1 | 5/2020 | Guiu et al. | |
| 2020/0160117 | A1* | 5/2020 | Urtasun | G06V 10/82 |
| 2021/0035015 | A1* | 2/2021 | Edgar | G06F 18/211 |
| 2021/0063162 | A1* | 3/2021 | Moskowitz | G01C 21/28 |
| 2021/0146952 | A1 | 5/2021 | Vora et al. | |
| 2024/0386054 | A1* | 11/2024 | Wouhaybi | G06F 16/901 |
| 2024/0393776 | A1* | 11/2024 | Olander | G01R 21/133 |

FOREIGN PATENT DOCUMENTS

| | | | | |
|---|---|---|---|---|
| WO | WO 2008/018064 A2 | 2/2008 | | |
| WO | WO-2016038535 A1 * | 3/2016 | ............ | G06F 16/56 |
| WO | WO-2021021488 A1 * | 2/2021 | ............ | G06F 16/55 |

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

Vora, S. et al., "PointPainting: Sequential Fusion for 3D Object Detection", CVPR 2020, May 2020, arXiv:1911.10150v2, in 11 pages.

Great Britain Office Action issued for Application No. GB 2116515.4, dated Nov. 23, 2021.

Great Britain Office Action issued for Application No. GB 2116515.4, dated May 13, 2022.

Korean Office Action issued for Application No. KR 10-2021-0179093, dated Feb. 22, 2024.

* cited by examiner

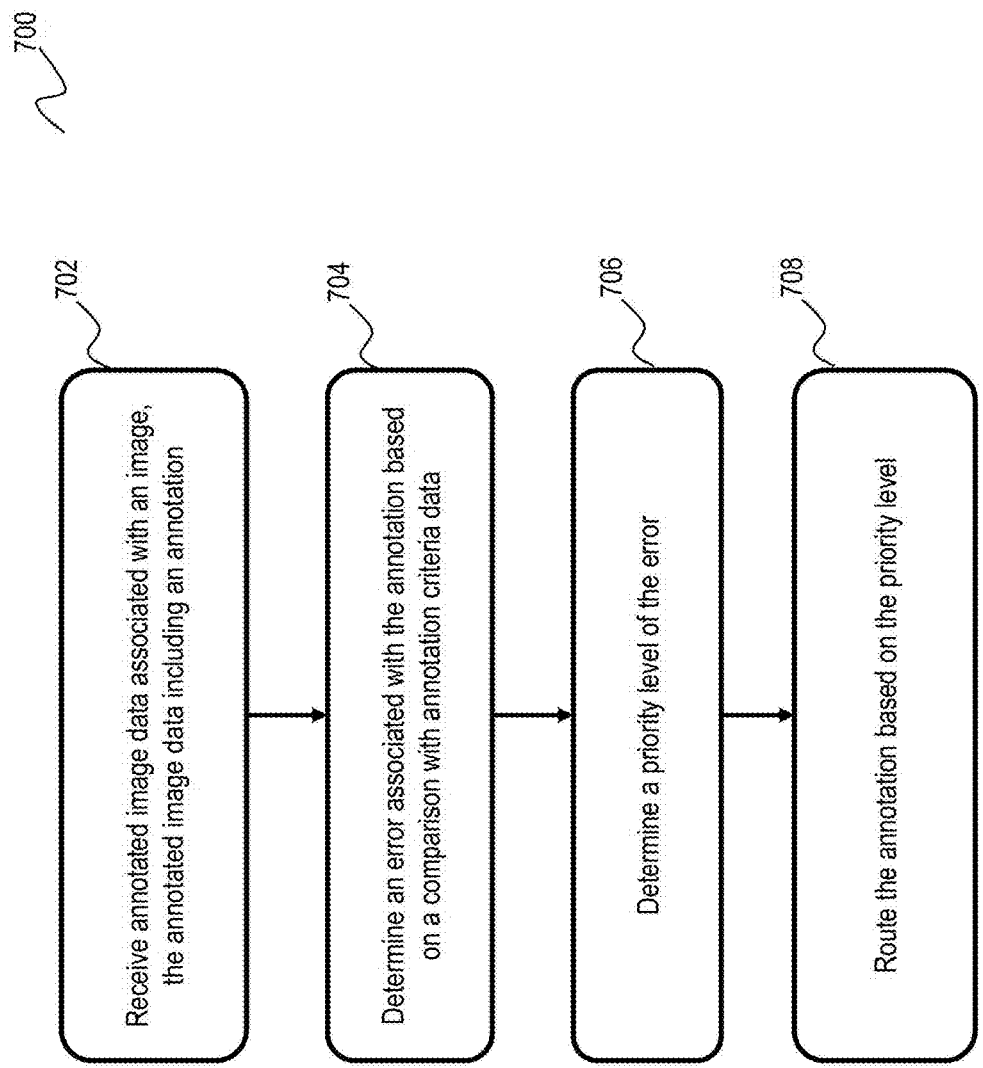

AUTOMATED VERIFICATION OF ANNOTATED SENSOR DATA

BACKGROUND

Self-driving vehicles typically use sensor data to perceive the area around them. Verifying annotations of the sensor data that identify features or characteristics of objects in the area can be difficult and complicated.

BRIEF DESCRIPTION OF THE FIGURES

FIG. 7 is a flow diagram illustrating an example of a routine implemented by one or more processors to route an image annotation based on a priority level of an error of the image annotation.

DETAILED DESCRIPTION

Figure 1:
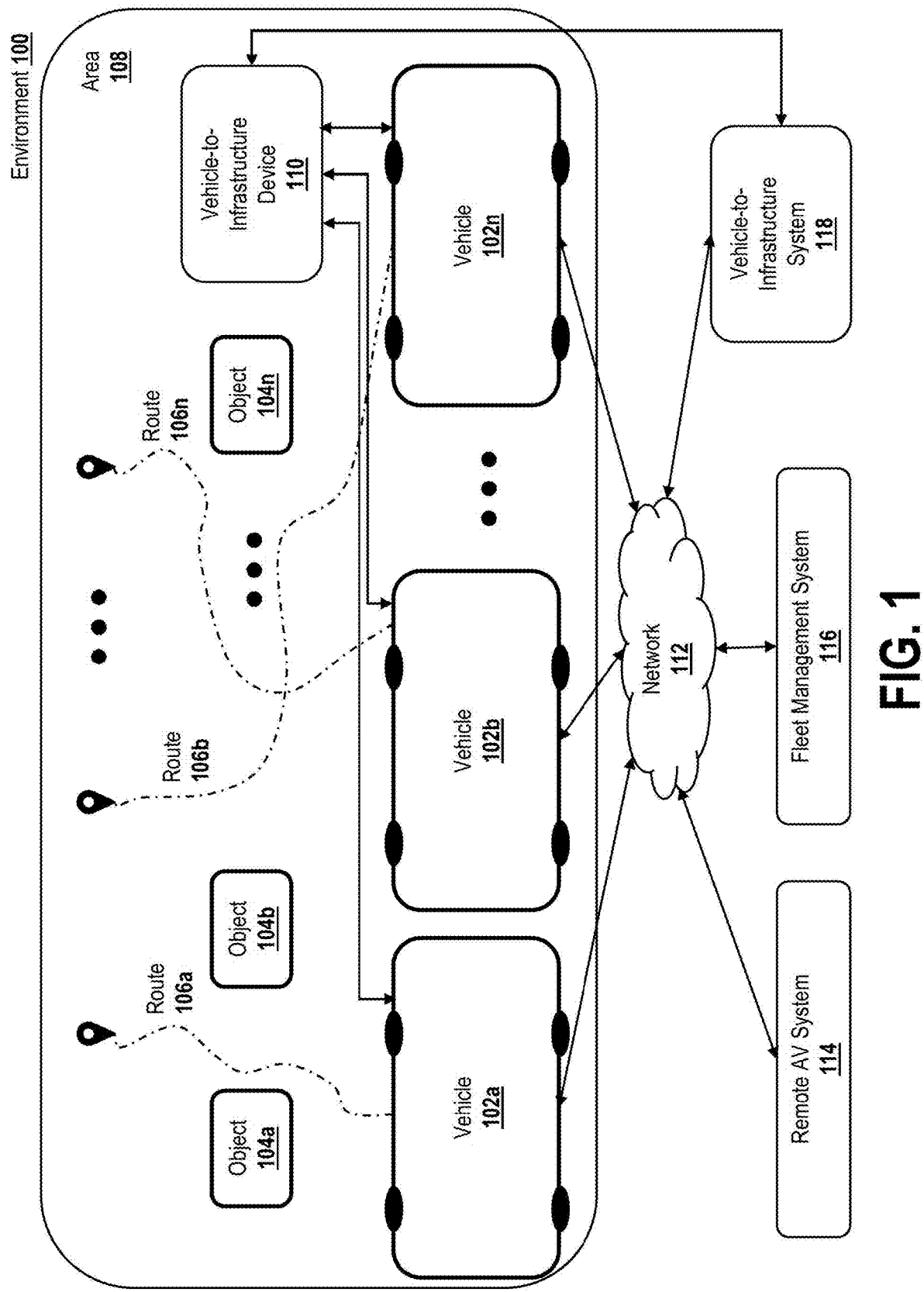
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event],"

and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement a signal processing system that routes an annotation of sensor data to a particular destination based on an error (and/or a priority level of the error) of the annotation. The signal processing system can receive annotations of sensor data in order to identify particular objects or features in an image of an area based on the sensor data. The signal processing system can compare the annotation with annotation criteria data to identify an error of the annotation and determine how to route the annotation based on the error. As a non-limiting example, the signal processing system can route an annotation of sensor data to a particular destination based on an error by receiving an annotation of an object within an image, determining an error of the annotation by comparing the annotation with annotation criteria, determining a priority level of the error, and routing the annotation to a particular destination based on the priority level.

By virtue of the implementation of systems, methods, and computer program products described herein, a system can review larger quantities (or all) annotations from a set of annotated image data. For example, the system may be able to review all annotations, all annotations that are identified as potentially erroneous (e.g., have a particular risk level), etc. Further, the system can more accurately and efficiently verify and/or review the annotations. By comparing annotations with annotation criteria data and using this comparison to identify an error of the annotations, the system can more accurately determine inaccurate annotations. For example, the annotation criteria data may include world data, task definition data, annotations generated by a neural network, etc. Further, the system can improve the verification process by enabling a fully or partially automated verification process for reviewing annotations. Such a fully or partially automated verification process can improve the quality and efficiency of the verification process. Additionally, such a fully or partially automated verification process can reduce the cost associated with the verification process. For example, the system may be able to more quickly and more accurately identify potentially erroneous annotations and determine how to route the annotations while reducing the cost of the verification process.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high-level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high-level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
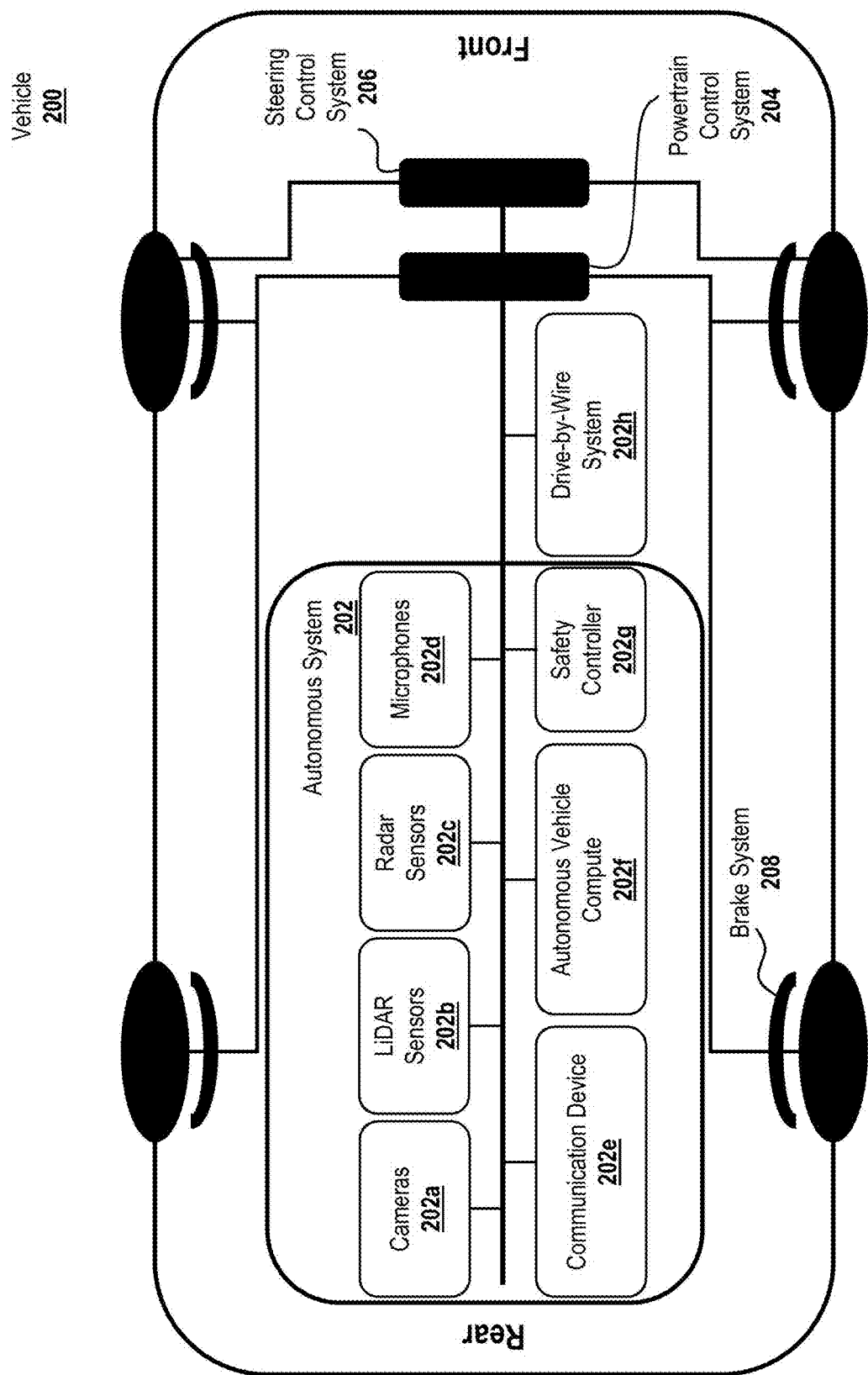
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
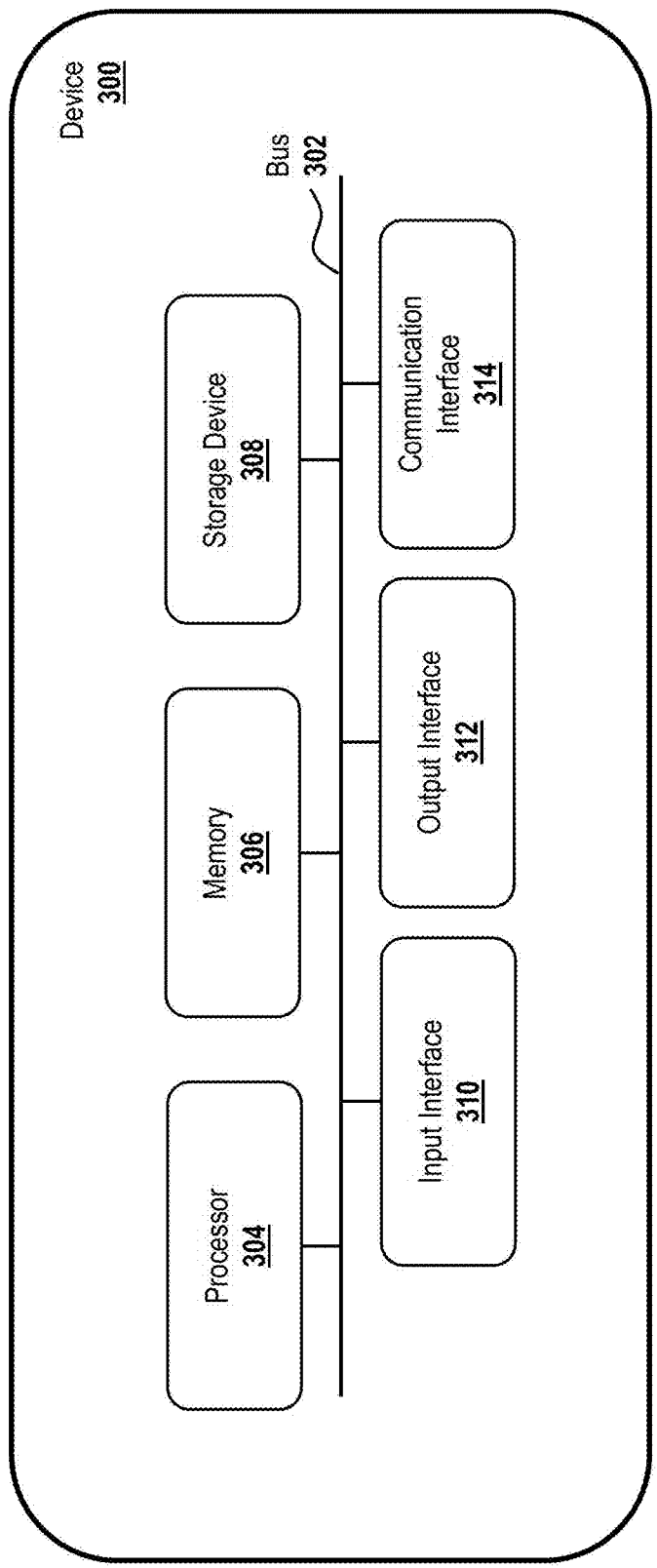
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum.

In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid-state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally, or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally, or alternatively, a set of components (e.g., one or more components) of device 300 can perform one or more functions described as being performed by another component or another set of components of device 300.

Figure 4:
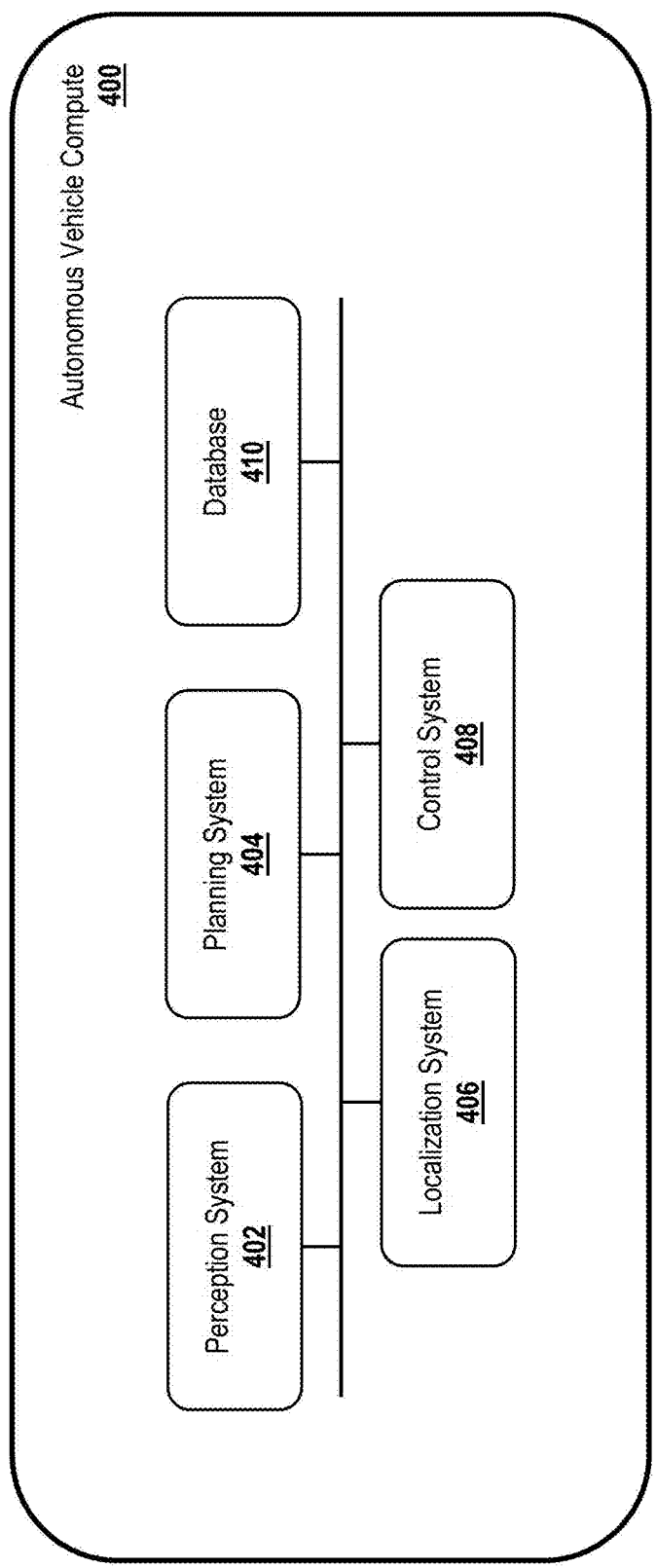
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like. In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Comparing Image Annotations with Annotation Criteria Data

As an autonomous vehicle moves through an area, the vehicle may encounter a number of different objects within an area. In order to identify the objects, the vehicle can capture sensor data associated with an image of an area. Further, the vehicle may implement a machine learning model to receive the sensor data and identify particulars objects within the image of the area. As the vehicle may encounter many different objects while moving (e.g., birds, pedestrians, traffic signs, other vehicles, buildings, etc.), it may be important that the machine learning model be able to accurately identify objects. For example, it may be important that the machine learning model be able to differentiate between a bird and a human as the vehicle may elect different actions based on the whether the object is a bird (e.g., turn slightly) or a human (e.g., brake). The actions associated with encountering a first object may produce adverse effects when implemented when encountering a second object. Therefore, it may be important that the machine learning model accurately identify different objects within the image of the area. In order to accurately identify the objects, the machine learning model may be trained on a set of training data that identifies annotations for particular objects within an image.

However, there can be inaccuracies within the training data. For example, the training data may include a first annotation for a first object identifying the first object as a first object-type (e.g., a building), but the first object may be a second object-type (e.g., a bus). As the training data (e.g., annotation data) may be provided and generated by third party computing devices, it may be important to verify whether the annotation data is correct. Further, if inaccuracies exist within the training data, the machine learning model may be trained to misidentify particular objects. This potential for inaccuracies within the training data can make it difficult for a perception system to accurately and efficiently identify objects within an image of an area. In order to identify inaccuracies within the training data, some systems may provide a portion of the training data to a computing system for quality assurance. However, providing the training data to a computing system for quality assurance can be inefficient and cost prohibitive as the costs of the quality assurance may increase significantly as the amount of training data provided to the computing system increases. Therefore, the system may provide a limited portion of the training data to the computing system for quality assurance.

Further, the system may not be capable of identifying whether the portion of the training data to the computing system for quality assurance includes a representative portion of the training data. For example, the system may provide a first portion of the training data to the computing system for quality assurance that contains few or no inaccuracies and a second portion of the training data that is not provided to the computing system for quality assurance may contain a significantly greater number of inaccuracies. The inaccuracies that are not provided to the computing system for quality assurance may be provided to the machine learning model for training of the machine learning model. By training the machine learning model on training data that includes the inaccuracies, the perception system (e.g., of an autonomous vehicle) may be unable to quickly and accurately identify objects or features of an image. This can also lead to an inadequate user experience as the perception system may be limited to verifying a limited portion of the training data (with increased cost and decreased efficiency).

To address these issues, a perception system can use annotation criteria data for verifying the training data. In some cases, the perception system can verify all or a portion of the training data with the annotation criteria data by comparing the training data with the annotation criteria data (e.g., via a "linter" for annotations). By proactively verifying all of the training data (instead of verifying a limited portion of training data that is sent for quality assurance) based on the annotation criteria data, the perception system can increase the likelihood that the training data provided to the machine learning model for training is accurate. Further, the perception system can reduce the inaccuracies provided by the trained machine learning model based on the annotation criteria data. The perception system can also prioritize images that are more likely to be annotated incorrectly and route these images for further annotation and/or quality assurance. Further, such a fully or partially automated verification process can reduce the cost associated with verifying the training data.

The annotation criteria data may include annotation data generated by a second machine learning model. The second machine learning model may be trained to identify objects within an image of an area and generate annotations for the objects. The perception system may compare annotations of the training data with the annotations of the annotation criteria data. If any discrepancies exist between the annotations, the perception system may route a particular portion of the training data for further processing.

Further, the annotation criteria data may include one or more annotation rules. For example, the annotation rules may identify that a particular annotation may not be empty, may not be invalid, and/or may not overlap with another annotation, etc. In some cases, an annotation may be empty if the annotation is broken (e.g., the annotation is an incomplete or unclosed annotation) and/or if the annotation has a width and/or length of 0. In certain cases, an annotation may be invalid if attributes of the associated object (e.g., a car can have emergency lights on or off, a car can be moving, parked, or stopped, etc.) combine to form an incomplete or invalid combination of attributes. In some cases, the annotation rules may identify that an annotation may overlap with another annotation (e.g., when the annotation is a box annotation). In certain cases, the annotation rules may identify that annotation may not overlap with another annotation (e.g., when only one semantic label may be assigned to each pixel). The perception system can utilize the one or more annotation rules to confirm that the training data satisfies the one or more annotation rules. If any of the training data does not satisfy the one or more annotation rules, the perception system may route a particular portion of the training data for further processing.

The annotation criteria data may include one or more object rules. For example, the object rules may identify particular characteristics or features of particular objects. The perception system can utilize the one or more object rules to confirm that the training data satisfies the one or more object rules and, if the one or more object rules are not satisfied, route a particular portion of the training data for further processing.

The perception system may determine an error for each annotation of the training data and a corresponding priority level of the error based on comparing the training data and the annotation criteria data. Based on the determined error and priority level of the error, the perception system can route a first portion of the training data (e.g., the training data with no error or a lower priority level) to the machine learning model for training, a second portion of the training data (e.g., the training data with an error with a medium priority level) to the computing system for quality assurance, and/or a third portion of the training data (e.g., the training data with an error with a high priority level) to the third party computing devices that generated the training data.

Figure 5:
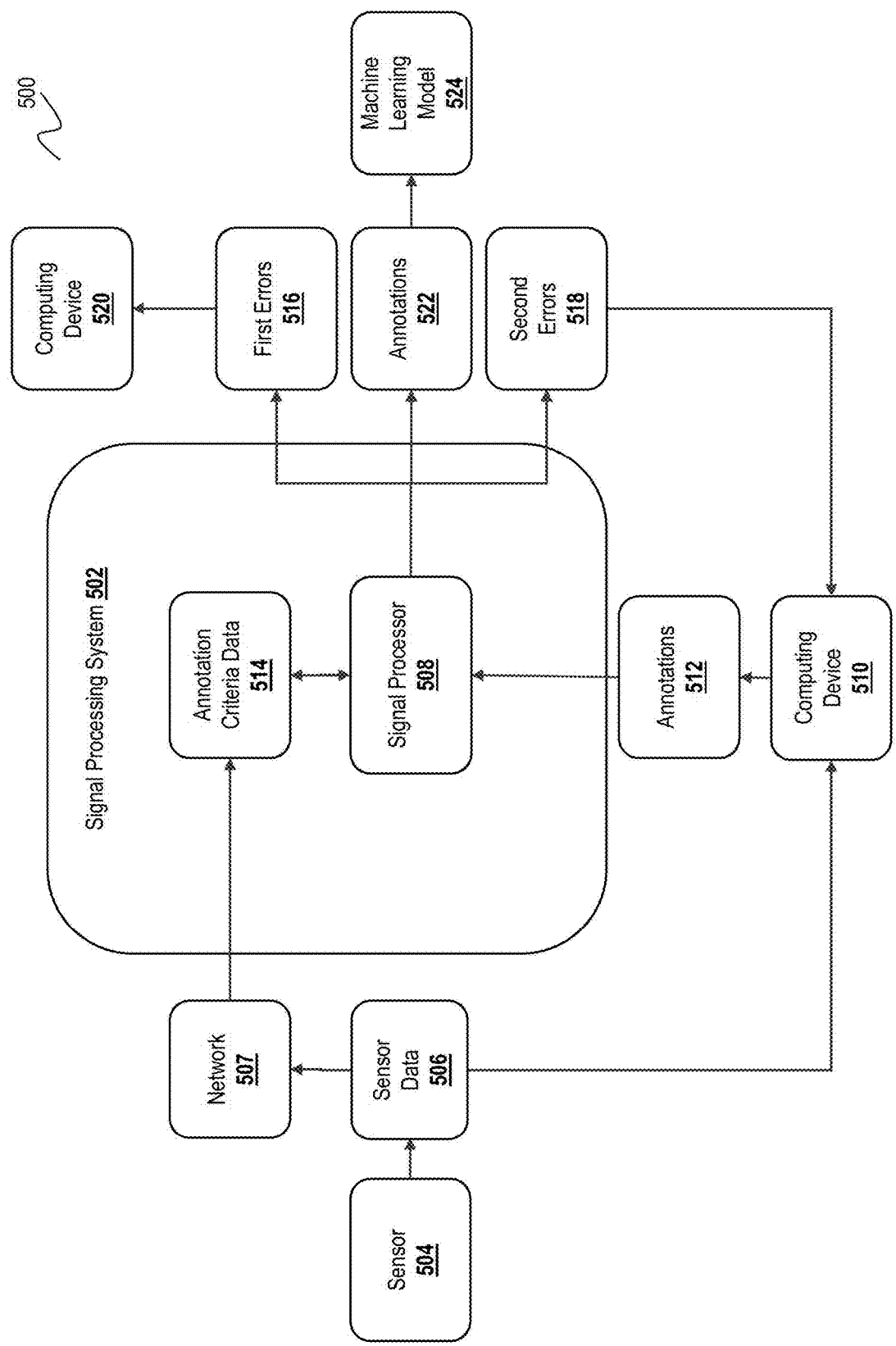
FIG. 5 is a block diagram illustrating an example of a signal processing system.

FIG. 5 is a block diagram illustrating an example of a signal processing environment 500. In the illustrated example, the signal processing environment 500 includes a signal processing system 502 communicatively coupled with a sensor 504, a network 507, a computing device 510, a computing device 520, and a machine learning model 524. In some cases, the signal processing environment 500 and/or the signal processing system 502 can form at least a part of the perception system 402, described herein at least with reference to FIG. 4. The signal processing system 502 can receive annotations 512 of sensor data 506 for comparison with the annotation criteria data to determine how to route the annotations 512.

The sensor 504 generates sensor data 506 and communicates the sensor data 506 to the network 507 and the computing device 510. In some embodiments, the sensor 504 may communicate the sensor data 506 to the signal processing system 502. The sensor 504 can include any one or any combination of a camera 202a, LiDAR sensor 202b, radar sensor 202c, etc., similar to that described above with reference to FIG. 2. Similarly, the sensor data 506 can include different types of sensor data, such as camera data associated with a camera image, radar data associated with a radar image, and/or LiDAR data associated with a lidar image, etc. The sensor 504 may generate sensor data 506 based on one or more sensor signal processing settings (e.g., white balance, gain, tint, exposure, color balance, saturation, etc.).

In some embodiments, the network 507 and/or the computing device 510 may obtain the sensor data 506 from a different component. Further, the one or more sensors 504 and/or a different component can perform preliminary signal processing to modify the sensor data 506 prior to the network 507 and/or the computing device 510 obtaining the sensor data 506.

The network 507 can be implemented using one or more networks (e.g. one or more CNNs). For example, the network 507 can be implemented using an image semantic network and/or a lidar semantic network. The network 507 can receive the sensor data 506 as input and output a semantic image and/or semantic data associated with the semantic image.

The network 507 can include an image feature extraction network. In certain cases, the image feature extraction network can be implemented using the DeepLabv3+ or PSP+ neural network models. However, it will be understood that a variety of neural networks can be used to extract features from an image. In some cases, the sensor data 506 may correspond to camera images, however, it will be understood that various types of images can be used as an input for the image feature extraction network.

As described herein, the image feature extraction network can include one or more filters, convolution layers, subsampling layers, and/or fully connected layers that can be used to identify and classify different objects in the sensor data 506 (e.g., vehicle, pedestrian, bicycle, barrier, traffic cone, drivable surface, or a background, etc.). Accordingly, in certain cases, the semantic data output by the image feature extraction network can identify one or more objects in the sensor data 506 and the object classification for the respective objects.

The semantic image can include rows of pixels. Some or all pixels in the semantic image can include semantic data, such as one or more feature embeddings. In certain cases, the feature embeddings can relate to one or more object attributes, such as but not limited to an object classification or class label identifying an object's classification (sometimes referred to as an object's class) (non-limiting examples: vehicle, pedestrian, bicycle, barrier, traffic cone, drivable surface, or a background, etc.). The object classification may also be referred to as pixel class probabilities or semantic segmentation scores. In some cases, the object classification for the pixels of sensor data 506 can serve as compact summarized features of the sensor data 506. For example, the object classifications can include a probability value that indicates the probability that the identified object classification for a pixel is correctly predicted.

In some cases, the feature embeddings can include one or more n-dimensional feature vectors. In some such cases, an individual feature vector may not correspond to an object attribute, but a combination of multiple n-dimensional feature vectors can contain information about an object's attributes, such as, but not limited to, its classification, width, length, height, etc. In certain cases, the feature embeddings can include one or more floating point numbers, which can assist a downstream model in its task of detection/segmentation/prediction.

The network 507 may further include a 3D bounding box network. The 3D bounding box network can be implemented using one or more CNNs that can be configured to receive sensor data 507 as input and output feature data associated with one or more features extracted from the image, which may also be referred to herein as 3D feature data and/or 3D semantic data, and/or output an annotated image that includes the sensor data 507 and feature data associated with the one or more features extracted from the image. In some embodiments, the image feature extraction network and the 3D bounding box network may be implemented separately. In other embodiments, a first one of the image feature extraction network or the 3D bounding box network may generate an output that is provided as an output to a second one of the image feature extraction network or the 3D bounding box network. For example, the image feature extraction network may generate an output (e.g., semantic data) for input to the 3D bounding box network. In some such cases, the 3D bounding box network may also receive and/or use additional sensor data 506, such has lidar data, to generate the 3D semantic data.

As described herein, the 3D bounding box network can include one or more filters, convolution layers, subsampling layers, and/or fully connected layers that can be used to detect dimensions of objects in an image, such as, but not limited to the width, height, and/or length of the object in the image. The 3D bounding box network can also determine or estimate mobility parameters of the object, such as, but not limited to the object's orientation, 3D location, movement, velocity, trajectory, etc. The 3D bounding box network generates 3D bounding boxes for the object indicating the dimensions and/or mobility parameters of the object.

In some cases, the 3D bounding box network can be implemented using a lidar neural network and/or a prediction network. In certain cases, the 3D bounding box network can be implemented using the PointPillars, VoxelNet, or PointR-CNN networks.

In the illustrated example of FIG. 5, the input for the 3D bounding box network is sensor data 506. It will be understood that different types of images can be used. In some cases, the input for the 3D bounding box network can be painted lidar data or a fused image that includes lidar data concatenated with image semantic data from a semantic image, as described in U.S. application Ser. No. 17/096,916 and "PointPainting: Sequential Fusion for 3D Object Detection," arXiv: 1911.10150v2 [cs.CV] 6 May 2020, each of which is incorporated by reference herein for all purposes. In some cases, the 3D bounding box network can include a pillar encoder that outputs a pseudo image to a deep learning backbone network. The deep learning backbone can compute and output features to a detection head. The detection head can output oriented 3D bounding boxes, as described in "PointPillars: Fast Encoders for Object Detection from Point Clouds, arXiv: 1812.05784v2 [cs.LG] 5 May 2019, the contents of which are incorporated herein by reference in their entirety for all purposes.

The 3D feature data generated by the 3D bounding box network can include, but is not limited to, any one or any combination of dimensions and/or mobility parameters of an object in the image and/or bounding boxes for the object. The generated features can be encoded into the image to form an annotated image that includes annotations. In some cases, the 3D bounding box network can embed the 3D feature data into pixels of an image as one or more features or semantics.

In some cases, some or all pixels in the annotated image can include 3D feature data associated with one or more features extracted from that pixel, a group of pixels, or the image. For example, a pixel in the annotated image can include one or more location values indicating a dimension or mobility parameter associated with the portion of the object that corresponds to the pixel, a bounding box value indicating an edge or a portion of a bounding box. For example, 3D feature data of a pixel can indicate a velocity, orientation, 3D location and/or classification of an object associated with the pixel.

Some or all of the pixels in the annotated image can include additional data. For example, a pixel in the annotated image can include image data associated with at least one type of image (e.g., the image data of at least one of the images used to create the image), image semantic data associated with the image (e.g., the semantic data generated by the image feature extraction network, such as the object's classification), and 3D feature data associated with a feature of the object (e.g., the feature data generated by the 3D bounding box network). For example, a pixel in the annotated image can include one or more annotations for location (x, y, z), reflectance, intensity, time stamp, different object class probabilities, associated bounding box, trajectory prediction, movement, velocity estimation, etc. Therefore, the network 507 can determine annotations via the annotated image for the sensor data 506 and provide the annotations, via the annotated image, to the signal processing system 502.

The signal processing system 502 (or another related system) may provide instructions to the computing device 510. The instructions may identify how to generate the annotations 512. For example, the instructions may include annotation rules that define objects for annotation and a manner of annotation (e.g., the annotation rules may define a format or style of the annotation), error definitions that define annotation errors and a desired quality level, and/or any other instructions for generating the annotations 512.

The computing device 510 (e.g., a third party computing device) may also receive the sensor data 506 capturing an image of a scene. The computing device 510 may receive the sensor data 506 as unannotated sensor data that does not include annotations.

Based on the instructions from the signal processing system 502 and the sensor data 506, the computing device 510 may generate annotations 512 for the signal processing system 502. For example, a user may use the computing device 510 to generate the annotations 512 by annotating the sensor data 506. The annotations 512 may include annotated sensor data. Further, the annotations 512 may include one or more identifiers of objects in an image of an area captured by the sensor data 506. For example, the annotations 512 may identify a first object in the image of the area captured by the sensor data 506 as a "dog," a second object as a "vehicle," a third object as a "building," etc. It will be understood that the annotations 512 may include more, less, or different annotations (e.g., identifiers, labels, lidar segmentation labels, etc.).

The annotations 512 may identify a particular object and an annotation for the object. For example, the annotations 512 may include a plurality of field-value pairs for each object that identifies an identifier of the object (e.g., coordinates of the object) and an annotation of the object. Further, the annotations 512 may be formatted in an in-memory database format or a main-memory database format.

The signal processing system 502 includes a signal processor 508 to receive the annotations 512. Further, the signal processor 508 may identify and/or generate annotation criteria data 514 that is associated with the sensor data 506 and/or the annotations 512. For example, the signal processor 508 may identify particular annotation criteria data based on metadata associated with the sensor data 506 and/or the annotations 512 (e.g., annotation criteria data 514 associated with the sensor data 506 and/or the annotated image and/or annotations from the network 507).

In some cases, the annotation criteria data 514 may include a priori annotation criteria data (e.g., object rules). The a priori annotation criteria data may include data (or rules) identifying or defining characteristics or features of objects (e.g., defining how a particular object should act). For example, the a priori annotation criteria data may include observed or known characteristics for particular objects or particular types of objects. A particular object or type of object may be associated with a subset of a priori annotation criteria data that indicates how the object acts. For example, the a priori annotation criteria data may indicate that all objects move in a spatio-temporally consistent manner, certain types or classes of objects are not located in the sky, each object has a characteristic shape and/or size corresponding to the type of object (e.g., pedestrians have an expected shape and/or size), etc. Therefore, the a priori annotation criteria data may identify characteristics or features of objects.

In some cases, the annotation criteria data 514 may include definition criteria data (e.g., annotation rules). The definition criteria data may include data (or rules) identifying or defining characteristics or features of annotations (e.g., defining what constitutes a valid annotation). For example, the definition criteria data may include defined characteristics for all or a portion of the annotations. In some embodiments, the signal processor 508 determines that an annotation is considered a valid annotation if the annotation satisfies the definition criteria data. The definition criteria data may include any definition of an annotation. For example, the definition criteria data may indicate that annotations should not overlap (e.g., a particular annotation should not overlap with another annotation), annotations should not be empty (e.g., annotations should point to a valid object and include a valid identifier), etc. Therefore, the definition criteria data may identify characteristics or features of valid or invalid annotations.

In some cases, the annotation criteria data 514 may include annotations (e.g., a posteriori annotation criteria data) from the network 507 The a posteriori criteria data may include one or more annotations for the sensor data 506. For example, the a posteriori criteria data can include one or more annotations that may or may not correspond to the annotations 512. Therefore, the a posteriori criteria data may identify annotations of the sensor data 506.

For example, the annotation criteria data 514 may indicate that size limits for the size of an object based on the class or type of the object, the width/length aspect ratio ranges for the width/length aspect ratio of the object based on the class or type of the object, annotations reference valid annotation coordinates within the image, an objects is not located in the sky (e.g., based on sky annotations, image gradients, distance and angle from perception system, etc.), a particular object is rare, a particular object is located far away from the perception system, speed and/or turning rate constraints of an object across image frames, neighboring instance masks have do not overlap (or have a maximum amount of overlap), an object has a valid non-empty mask, three-dimensional box annotations and two-dimensional box/mask annotations are consistent, three-dimensional box lidar segmentation labels and two-dimensional mask annotations are consistent, the number of lidar segmentation labels are below a maximum number (e.g., to limit the frequency of lidar segmentation labels).

The signal processor 508 of the signal processing system 502 can compare the annotations 512 and the annotation criteria data 514 prior to providing the annotation criteria data 514 as an output. In order to compare the annotations 512 and the annotation criteria data 514, the signal processor 508 can compare individual annotations of the annotations 512 with individual criteria of the annotation criteria data 514. For example, the signal processor 508 may determine whether the annotations 512 satisfy the a priori criteria data and/or the definition criteria data. Further, the signal processor 508 may compare the annotations 512 with the annotations identified by the a posteriori annotation criteria data.

In some cases, in order to compare the annotations 512 and the annotation criteria data 514, the signal processor 508 can perform one or more automated checks (verifications) or annotation linters (e.g., analysis tools to determine errors within the annotations 512). The signal processor 508 may perform the one or more annotation linters in order to verify the annotations 512. In some embodiments, upon determining that a particular automated check or annotation linter has failed, the signal processor 508 can trigger a linter warning.

Based on the comparison of the annotations 512 and the annotation criteria data 514, the signal processor 508 can determine an error and a priority level of the error for each annotation of the annotations 512. The error may be based on the sensor data and/or the annotation process performed by the computing device 510. For example, the error may be based on a reflection in the image, an object that covers the image, missing annotations, the instructions for the computing device 510, etc. The signal processor 508 can identify an annotation as inaccurate (e.g., contains an error) based on determining a probability that the annotation is inaccurate and comparing this probability with a probability threshold (e.g., the signal processor 508 must have a 75% probability that an annotation includes an error in order identify an annotation as inaccurate). The signal processor 508 may comparatively determine the error for each annotation of the annotations 512. For example, the signal processor 608 may obtain a baseline error for a particular annotation and may compare the error for each annotation to the baseline error to determine the probability of the error.

Further, the signal processor 508 may determine a priority level of the error (e.g., errors with a higher probability may have a higher priority level). For example, the signal processor 508 can identify that the annotation includes an error and assign the error a high priority level based on the determined probability of the annotation including an error. Further, the signal processor 508 may rate the errors on a scale (e.g., a scale from 1-10). For example, errors with a priority level of 1 to 5 may have a low priority level (e.g., indicating a potential error) and errors with a priority level of 6 to 10 may have a high priority level (e.g., indicating a high probability of an error).

In some embodiments, the signal processor 508 can determine an error and a priority level of the error for a group of annotations. For example, the signal processor 508 can determine an error and a priority level of the error for an image that includes and/or is associated with multiple annotations. In order to determine the error and the priority level of the error for the group of annotations, the signal processor 508 can perform one or more mathematical operations on the priorities of the errors of each annotation of the group of annotations. For example, the signal processor 508 can aggregate the individual priorities, determine a maximum priority of the individual priorities, average the individual priorities, determine the minimum priority of the individual priorities, determine the mode or medium of the individual priorities, or perform any other mathematical operation on the individual priorities.

The signal processor 508 can group the annotations 512 (or the images) into one or more groups based on the determined error and priority level for each annotation. For example, the signal processor 508 can group annotations (or images) with errors with a low priority level as first errors 516 (e.g., soft errors) and annotations with errors with a high priority level as second errors 518 (e.g., hard errors). Further, the signal processor 508 can group annotations 522 of the annotations 512 as annotations that do not include any errors. For example, errors below a particular error level threshold may be first errors and errors above or equal to the particular threshold may be second errors. The signal processor 508 can route the first errors 516 to a computing device 520 (e.g., a computing device for performing quality assurance), the second errors 518 to a computing device 510 (e.g., the third party computing device), and the annotations 522 to the machine learning model 524 for training the machine learning model 524.

In some cases, the signal processor 508 can provide a group of annotations (or images) with varying priority levels to the computing device 520. For example, the signal processor 508 can provide a group of annotations with descending priority levels. Therefore, the computing device 520 may receive a representative sample of annotations from the annotations 512.

The signal processor 508 may determine how to group the annotations 512 based on a group definition defining how annotations and/or images are grouped. Further, the signal processor 508 may determine how to group the annotations 512 based on one or more pre-defined groups.

In some cases, the signal processor 508 may group the annotations into more, less, or different groups. For example, the signal processor 508 may group annotations with no errors or errors with a low priority level as first errors 516 and annotations with errors with a high priority level as second errors 518. The signal processor 508 can provide the first errors 516 to a computing device 520 and the second errors 518 to a computing device 510.

The signal processor 508 may provide the second errors 518 to the computing device 510 and may request recalibration of the annotation process. For example, the signal processor 508 may identify the second errors 518 and request updated annotations from the computing device 510. In response to the request, the computing device 510 may provide updated annotations that are based on the identified second errors 518. Therefore, the signal processor 508 may be able to generate feedback in order to calibrate how the computing device 510 generates annotations 512 for the signal processor 508.

Further, the signal processor 508 may provide the first errors 516 to the computing device 520. The computing device 520 may perform quality assurance based on the first errors 516 and may identify a first portion of the first errors 516 as errors and a second portion of the first errors 516 as non-errors. For example, the signal processor 508 may identify a first annotation as having a low priority level while the computing device 520 may determine the first annotation contains an error. Based on this identification, the computing device 520 can provide feedback to the signal processor 508 and the signal processor 508 may adjust how errors are identified and how priority levels of errors are assigned. For example, the computing device 520 may determine one or more modifications to the annotation linters based on the identification. Therefore, the computing device 520 may be able to generate feedback in order to calibrate how the signal processor 508 generates and assigns errors and priority levels of errors for the annotations 512.

It will be understood that the signal processing system 502 can include fewer, more, or different components. For example, the signal processing system 502 can include multiple signal processors 508 performing different processing function on the sensor data 506 and/or processing sensor data 506 from different sensors 504.

Example Operating Diagrams of Signal Processor

Figure 6A:
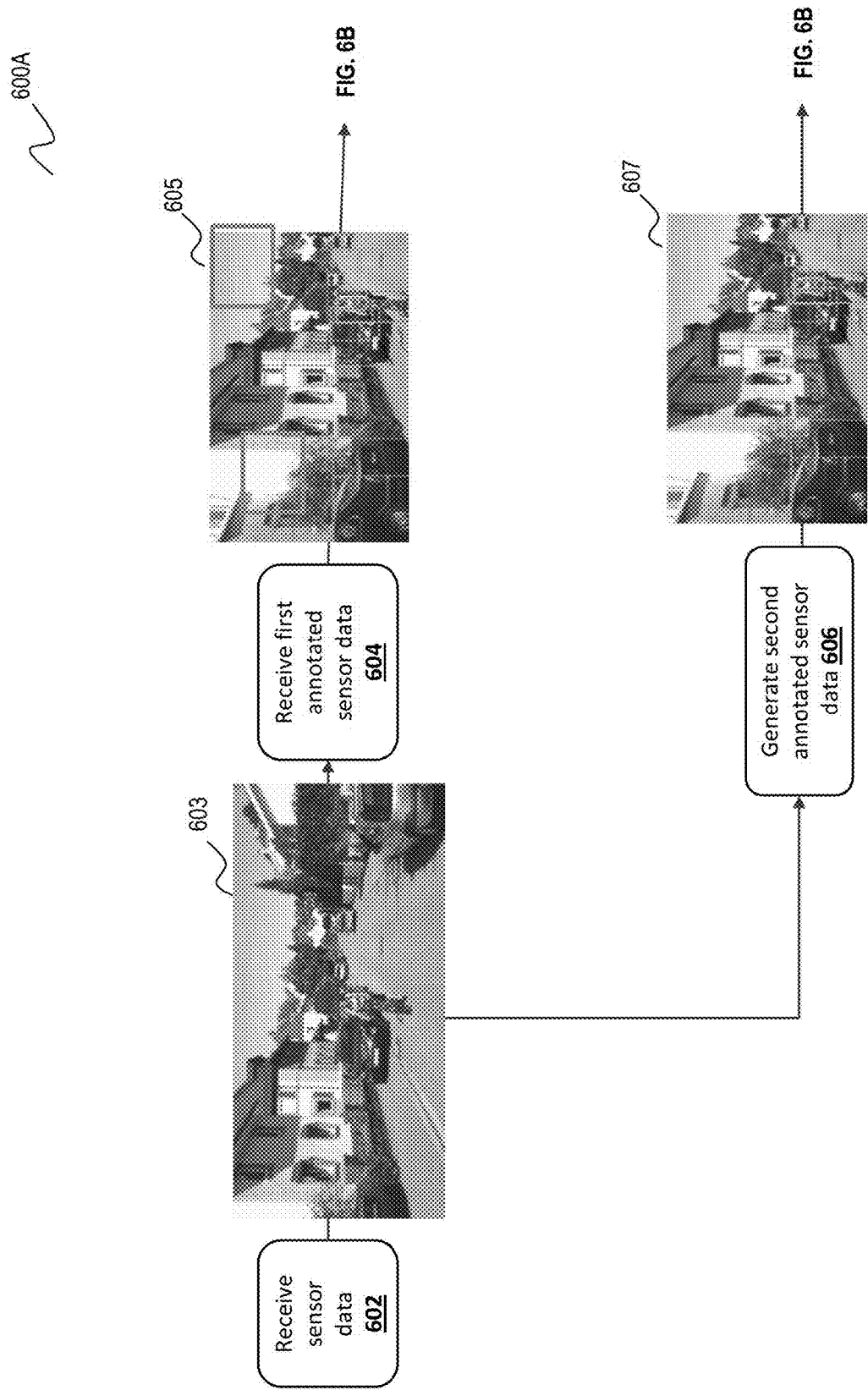
FIG. 6A is a flow diagram illustrating an example image annotation operation.
Figure 6B:
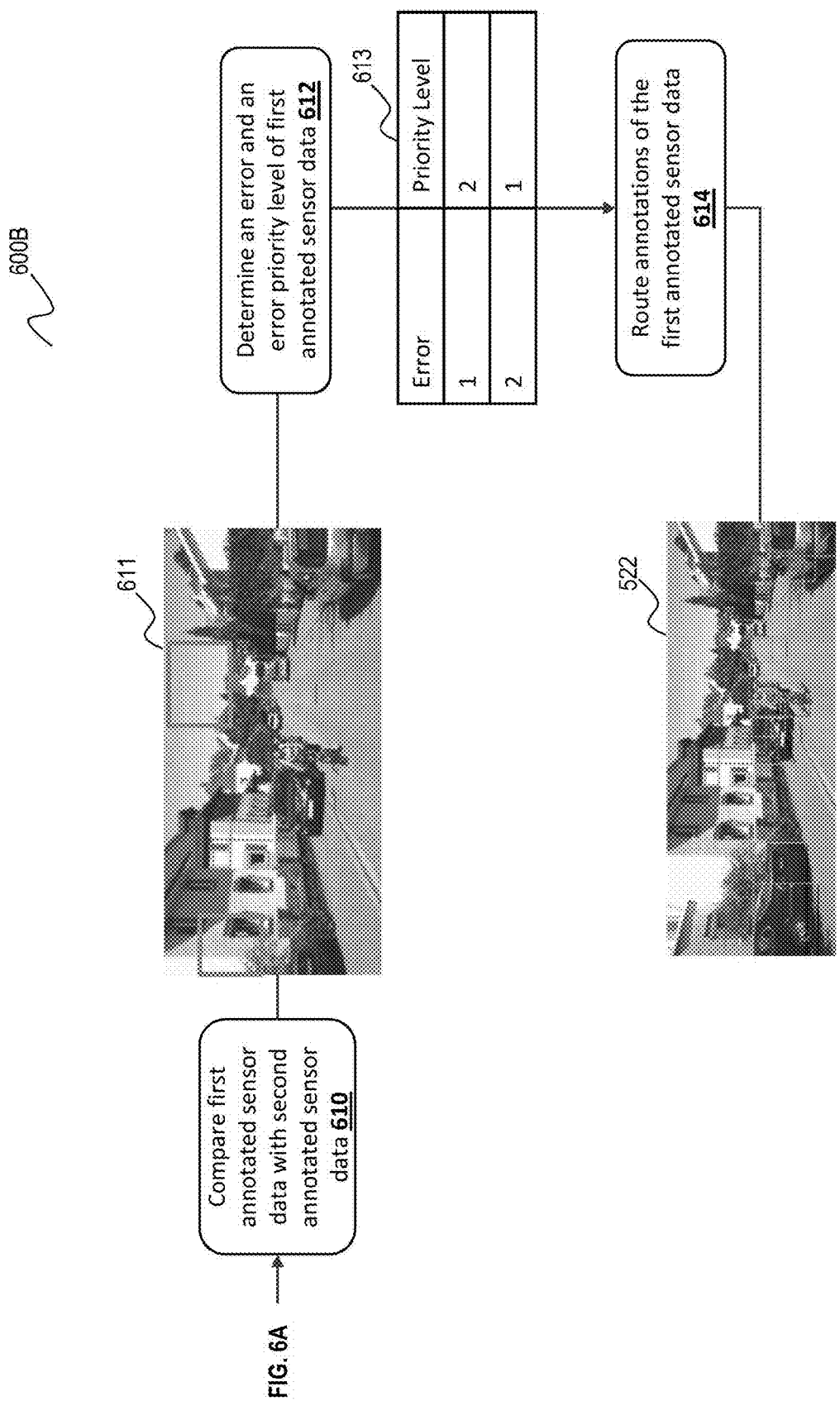
FIG. 6B is a flow diagram illustrating an example verification of image annotations.

FIGS. 6A and 6B are operation diagrams illustrating a data flow for comparing annotations with annotation criteria data. Specifically, FIGS. 6A and 6B are operation diagrams illustrating a data flow for comparing first annotated sensor data 605 (e.g., annotated sensor data obtained from a computing device) with annotation criteria data that includes second annotated sensor data 607 (e.g., annotated sensor data from a machine learning model). Any component of the perception system 402 can facilitate the data flow for comparing annotations with annotation criteria data. In some embodiments, a different component can facilitate the data flow. In the example of FIG. 6A and FIG. 6B, a signal processing system facilitates the data flow.

At step 602, the signal processing system receives sensor data (e.g., image data) associated with a camera image 603. In the illustrated example, a camera image 603 is used, however, it will be understood that different types of images or sensor data can be used. As described herein, the camera image 603 can correspond to an image in a database that was generated from sensor data obtained from a camera, such as cameras 202a. In some cases, the camera image 603 can include multiple rows of pixels in a matrix, and each pixel can include a value for red, green, and blue or a grayscale value. In some embodiments, the camera image 603 may include preliminary annotations. In other embodiments, the camera image 603 does not include annotations and/or may be referred to as an unannotated camera image 603.

At step 604, the signal processing system receives first annotated sensor data 605 (e.g., a first annotated image). As described herein, the first annotated sensor data 605 can correspond to the camera image 603. The signal processing system may receive the first annotated sensor data 605 from a computing device (e.g., a third party computing device associated with a user that provides annotations via the third party computing device). In some embodiments, a different system may provide the first annotated sensor data 605 (e.g., an internal component or system of the perception system). In order to receive the first annotated sensor data 605, the signal processing system may provide the camera image 603 to the computing device. In some embodiments, the signal processing system may provide an identifier of the camera image 603 to the computing device. The signal processing system may receive the identifier with the first annotated sensor data 605 from the computing device. Further, the signal processing system may verify that the identifier associated with the first annotated sensor data 605 corresponds to the identifier provided with the camera image 603.

The first annotated sensor data 605 may include a plurality of annotations. In some embodiments, the first annotated sensor data 605 may include at least one additional annotation as compared to the camera image 603. For example, the camera image 603 may include a set of preliminary annotations (or no annotations) and the first annotated sensor data 605 may include a set of additional annotations.

At step 606, the signal processing system generates second annotated sensor data 607 (e.g., a second annotated image). As described herein, the second annotated sensor data 607 can correspond to the camera image 603 and/or the first annotated sensor data 605. The signal processing system may generate the second annotated sensor data 607 using a machine learning model (e.g., the network 507). For example, the machine learning model may include an image semantic network, a lidar semantic network, etc. In order to generate the second annotated sensor data 607, the signal processing system may provide the camera image 603 to the machine learning model. In some embodiments, the signal processing system may provide an identifier of the camera image 603 to the machine learning model. The signal processing system may receive the identifier with the second annotated sensor data 607 from the machine learning model. Further, the signal processing system may verify that the identifier associated with the second annotated sensor data 607 corresponds to the identifier provided with the camera image 603.

The second annotated sensor data 607 may include a plurality of annotations. In some embodiments, the camera image 603 may include a first set of annotations (e.g., a preliminary set of annotations), the first annotated sensor data 605 may include a second set of annotations, and the second annotated sensor data 607 may include a third set of annotations. Each of the first set of annotations, the second set of annotations, and/or the third set of annotations may include the same or different annotations.

Each of the first annotated sensor data 605 and the second annotated sensor data 607 may include a plurality of object identifiers and a plurality of corresponding annotations. For example, the object identifiers may be coordinates etc. that point to a particular subset of the annotated sensor data (e.g., pixels of an image that are identified as being associated with a pedestrian). In the example of FIGS. 6A and 6B, the object identifiers are depicted as boxes. Further, the annotated sensor data may identify a width, height, and length of an object, bounding boxes for an object, object movement, object orientation, object trajectory, or other object attributes.

Each of the object identifiers may be associated with or linked to a particular annotation (e.g., identifier, label, etc.). For example, a particular object may be identified by an object identifier (e.g., a pointer to a portion of the image) and an annotation (e.g., a label identifying the object as corresponding to a pedestrian).

FIG. 6B is an operation diagram 600B for comparing the first annotated sensor data 605 and the second annotated sensor data 607 and routing the first annotated sensor data based on this comparison. At step 610, the signal processing system compares the first annotated sensor data 605 with the second annotated sensor data 607. The signal processing system may compare the first annotated sensor data 605 with the second annotated sensor data 607 by obtaining a first set of annotations associated with the first annotated sensor data 605 and a second set of annotations associated with the second annotated sensor data 607. The signal processing system may compare the first set of annotations and the second set of annotations to determine if any discrepancies exist. For example, the signal processing system may determine that a discrepancy exists if one set of annotations includes an annotation for a particular object and the other set of annotations does not include an annotation for the particular object, the sets of annotations include different annotations for the same objects, etc.

In some cases, the signal processing system may compare the first annotated sensor data 605 and the second annotated sensor data 607 using one or more annotation linters. For example, the signal processing system may perform one or more checks and/or verifications of the first annotated sensor data 605 and the second annotated sensor data 607 to determine whether any potential errors exist.

In comparing the first annotated sensor data 605 and the second annotated sensor data 607, the signal processing system identifies third annotated sensor data 611. The third annotated sensor data 611 may identify any differences in the annotations of the first annotated sensor data 605 and the annotations of the second annotated sensor data 607. For example, the third annotated sensor data 611 may identify annotations that were not included in both the first annotated sensor data 605 and the second annotated sensor data 607. In some embodiments, if the third annotated sensor data 611 does not include any annotations, the first annotated sensor data 605 and the second annotated sensor data 607 may include the same annotations. It will be understood that the third annotated sensor data 611 may include more, less, or different annotations.

At step 612, the signal processing system determines an error and an error priority level of the first annotated sensor data. The signal processing system may determine an error for each difference between the first annotated sensor data 605 and the second annotated sensor data 607 as depicted by the third annotated sensor data 611. For example, the signal processing system may determine an error for each object of the sensor data that does not have the same annotation in both the first annotated sensor data 605 and the second annotated sensor data 607. Further, the signal processing system may also determine an error when the first annotated sensor data 605 identifies an annotation that the second annotated sensor data 607 does not identify.

Further, the signal processing system determines an error priority level for each error. The signal processing system may determine an error priority level for each error based on the type of error, the particular annotation, the differences between annotations, the type of objects, etc. For example, an error based on the first annotated sensor data 605 not including an annotation for a particular object and the second annotated sensor data 607 including an annotation for the object may have a higher priority level than an error based on an annotation of the first annotated sensor data 605 not matching an annotation of the second annotated sensor data 607. Further, an error based on a first difference in annotations (e.g., a plane vs. a bird) may have a lower priority level than an error based on a second difference in annotations (e.g., a human vs. a mannequin). Further, an error based on an annotation associated with a pedestrian may have a higher priority level than an annotation associated with a bird.

Further, the error priority levels may be user-specific, system-specific, etc. For example, a user may designate particular error priority levels (e.g., via a user computing device).

In some cases, the error priority levels may be based on previously identified errors. For example, the signal processing system may determine that particular errors have a higher priority level (e.g., based on feedback from users or other computing systems). Therefore, the signal processing system may dynamically adjust the error priority levels.

The signal processing system can store the errors and the error priority levels as error data 613. The error data 613 may identify an error and a corresponding error priority level for each error of the first annotated sensor data 605. In the example of FIG. 6B, the error data 613 identifies an error "1" with a priority level of "2" (e.g., on a scale from 1 to 10) and an error "2" with a priority level of "1."

In some cases, the signal processing system may determine an overall error priority level for the first annotated sensor data 605. For example, the signal processing system may sum, average, take the maximum, etc. the error priority level of the errors of the first annotated sensor data 605 to identify the overall priority level. In the example of FIG. 6B, the signal processing system may sum the individual priority levels of each error of the first annotated sensor data 605 to identify an overall error priority level of "3."

At step 614, the signal processing system routes annotations 522 of the first annotated sensor data 605 to a destination. The annotations 522 may correspond to a portion of the first annotated sensor data 605 that the signal processing system does not include errors or includes errors with a low priority level (e.g., a 1 on a scale of 1 to 10). For example, the annotations 522 may include the portion of the first annotated sensor data 605 that matches the second annotated sensor data 607. Further, the signal processing system may route the annotations 522 to a machine learning model as training data for training of the machine learning model.

The signal processing system may route additional portions of the first annotated sensor data 605 that include one or more errors with a non-low priority level (e.g., greater than a 1 on a scale of 1 to 10) to computing systems. For example, the signal processing system may route a first portion of the first annotated sensor data 605 to a computing system (e.g., to perform quality assurance) and a second portion of the first annotated sensor data 605 to the computing device that generated the first annotated sensor data 605 (e.g., to re-annotate the sensor data).

In some cases, the signal processing system may route the first annotated sensor data 605 based on the overall error priority level. For example, if the first annotated sensor data 605 has a low priority level (e.g., a 1), the signal processing system may route the first annotated sensor data 605 to the machine learning model (e.g., accept the first annotated sensor data 605), if the first annotated sensor data 605 has a medium priority level (e.g., between a 2 and a 5), the signal processing system may route the first annotated sensor data 605 to the computing system for performing quality assurance (e.g., partially accept the first annotated sensor data 605), and if the first annotated sensor data 605 has a high priority level (e.g., higher than a 5), the signal processing system may route the first annotated sensor data 605 to the computing system (e.g., reject the first annotated sensor data 605).

As described herein, the annotation verification process can be repeated thousands, hundreds of thousands, millions, or more times in order to verify first annotated sensor data 605 as the sensor data is received. By verifying the first annotated sensor data 605 based on annotation criteria data (e.g., second annotated sensor data 607 generated by a machine learning model), the signal processing system can identify errors of the first annotated sensor data 605. These additional features can enable the signal processing system to accurately and efficiently train a machine learning model using annotated sensor data.

In addition, during the verification process, some of the functions or elements described herein may not be used or may not be present. For example, during the verification process, the signal processing system may not receive the sensor data.

Example Flow Diagram of Signal Processor

FIG. 7 is a flow diagram illustrating an example of a routine 700 implemented by one or more processors (e.g., one or more processors of the signal processing system 502). The flow diagram illustrated in FIG. 7 is provided for illustrative purposes only. It will be understood that one or more of the steps of the routine illustrated in FIG. 7 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components may be used.

At block 702, the signal processing system 502 receives annotated image data associated with an image 603. Further, the annotated image data includes an annotation associated with an object within the image 603. As discussed above, the object may be associated with additional data, such as annotations, feature embeddings, etc. For example, the additional data may include a three-dimensional box, a two dimensional box, a two-dimensional mask, a lidar segmentation, or a map. The signal processing system 502 may receive the annotated image data from a computing device 510

At block 704, the signal processing system 502 determines an error with the annotation based on a comparison of the annotation with annotation criteria data 514. The annotation criteria data 514 is associated with criteria for at least one annotation (e.g., the annotation associated with the object within the image 603).

In some cases, the annotation criteria data 514 may include an annotation criterion and/or annotation rule (e.g., annotations may not overlap, an annotation may not be empty or invalid, etc.). Further, the signal processing system 502 may determine the error based on determining the annotation does not satisfy the annotation criterion. For example, the signal processing system 502 may determine the annotation does not satisfy the annotation criterion based on determining that the annotation overlaps with another annotation of another object, the annotation is not valid, the annotation is empty, etc.

Further, the signal processing system 502 may determine the annotation does not satisfy the annotation criterion based on determining that the annotation is different from a second annotation, associated with the object in a second image. For example, the annotation may indicate a first object type for the object and the second annotation may indicate a second object type for the object. In some embodiments, the image 603 and the second image may be different types of images (e.g., the image 603 may be a camera image and second image may be a lidar image). Further, in certain cases, the signal processing system 502 may determine the annotation does not satisfy the annotation criterion based on comparing a first type of annotation associated with the object and a second type of annotation associated with the same object (e.g., to determine if the different types of annotations associated with the same object have a threshold level of similarity or agreement).

In some cases, the annotation criteria data 514 may include second annotated image data associated with the image. The signal processing system 502 may receive the second annotated image data from a trained neural network that generates the second annotated image data based on the image. The second annotated image data may include a second annotation associated with the object of the image 603. Therefore, in comparing the annotation with the annotation criteria data, the signal processing system 502 may compare the annotation with the second annotation. Further, the signal processing system 502 may determine the error based on determining that the annotation is different from the second annotation. For example, the annotation may indicate a first object type for the object and the second annotation may indicate a second object type for the object.

In some cases, the annotation criteria data 514 may include an object rule (e.g., a rule defining how an object acts). Further, the signal processing system 502 may determine the error based on determining the annotation does not satisfy the object rule. For example, the signal processing system may 502 determine the annotation does not satisfy the object rule based on determining that the object associated with the annotation is located in a particular region of the image 603, the object is located in a region identified as sky, the location of the object is inconsistent with the location of the object in another image (e.g., the location of the object satisfies a distance threshold relative to a location of the object in at least one other image), the movement of the object between the image 603 and at least another image satisfies an object movement threshold (e.g., the object movement threshold based on a determined type of the object), at least one of a size or shape of the object satisfies a corresponding size threshold or shape threshold for the object (e.g., the size threshold and/or the shape threshold based on a determined type of the object), etc.

At block 706, the signal processing system 502 determines a priority level of the error. The signal processing system 502 may determine that the priority level of the error is a first priority level of a plurality of priority levels. For example, the plurality of priority levels may include priority levels on a scale of 1 to 10. The signal processing system 502 may determine the priority based on the type of error, the magnitude of the error, a comparison with other errors, etc.

In comparing multiple errors, the signal processing system 502 may determine multiple errors of multiple annotations of the same object. In some cases, the multiple annotations of the same object may each be different types of annotations (e.g., complementary annotations). For example, the signal processing system 502 may determine a first error with a first annotation of the object and a second error with a second annotation of the object. The signal processing system 502 may determine each error based on a comparison of the error and annotation criteria data and determine a priority level of each error. Further, the signal processing system 502 may compare the priority levels of each error and identify the priority level of the first error is greater than the priority level of the second error. Based on identifying the priority level of the first error is greater than the priority level of the second error, the signal processing system 502 may route one or more of the first annotation and the second annotation based on the priority level of the first error.

Further, the signal processing system 502 may determine multiple errors of multiple annotations (e.g., annotations of the same or different objects). The signal processing system 502 can determine an error associated with each annotation and a priority level of each error. Further, the signal processing system 502 may route each annotation based on determining the priority level of a corresponding error.

At block 708, the signal processing system 502 routes the annotation based on the priority level of the error. The signal processing system 502 may route the annotation to one or more of a plurality of destinations based on the priority level of the error.

The signal processing system 502 may determine that the error is a first error based on the priority level of the error and route the error determining the error is a first error. For example, the signal processing system 502 may route the annotation to a computing device 520 for additional review (e.g., a computing system to perform quality assurance). Further, the computing device 520 for additional review may be different from the source of the annotated image data.

The signal processing system 502 may determine that the error is a second error based on the priority level of the error and route the error based on determining the error is a second error. For example, the signal processing system 502 may route the annotation to a source (e.g., computing device 510) of the annotated image data.

In some cases, the signal processing system 502 may cause display of a plurality of errors identified in the annotated image data and a location of each of the plurality of errors. For example, the signal processing system 502 may cause display of a geographical map that identifies a location of annotated image data (e.g., a location where the annotated image data was captured) and errors determined in the annotated image data (e.g., the particular errors, the number of errors, the type of errors, etc.). The signal processing system 502 may further identify areas of the geographical map associated with a higher number of errors (e.g., geographical location where a large tree affects the received sensor data 506). Further, the signal processing system 502 can generate statistical data for display that identifies annotation statistics, warning statistics, error statistics, etc.

It will be understood that the routine 700 can be repeated multiple times using different annotated image data and/or different types of annotated image data. In some cases, the signal processing system 502 may iteratively repeat the routine 700 for multiple sets of annotated image data associated with an object within the image 603 received from different computing devices. Further, the signal processing system 502 may repeat the routine 700 for different sensors.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously recited step or entity.

What is claimed is:

1. A method, comprising:
   receiving, with at least one processor, annotated image data associated with an image, wherein a first portion of the annotated image data comprises an annotation associated with an object within the image;
   determining an error associated with the first portion of the annotated image data based at least in part on a comparison of the annotation with annotation criteria data associated with criteria for at least one annotation;
   determining a priority level of the error;
   identifying a particular destination for the annotation from a plurality of destinations based at least in part on the priority level of the error, wherein a first destination of the plurality of destinations is associated with a computing device, wherein a second destination of the plurality of destinations is associated with training of a neural network for autonomous driving, wherein each of the plurality of destinations is associated with a respective priority level of a plurality of priority levels of errors; and
   routing the annotation to the particular destination, wherein the neural network is trained using a second portion of the annotated image data based at least in part on determining the error.

2. The method of claim 1, wherein determining the priority level of the error comprises determining the priority level of the error is a first priority level of the plurality of priority levels,
   wherein routing the annotation to the particular destination comprises communicating the annotation to a source of the annotated image data based on determining the priority level of the error is the first priority level.

3. The method of claim 1, wherein determining the priority level of the error comprises determining the priority level of the error is a first priority level of the plurality of priority levels,
   wherein routing the annotation to the particular destination comprises communicating the annotation to the computing device for additional review, wherein the computing device is different from a source of the annotated image data.

4. The method of claim 1, wherein the annotation is a first annotation and the error is a first error, wherein the first portion of the annotated image data comprises a second annotation associated with the object, the method further comprising:

determining a second error associated with the first portion of the annotated image data based at least in part on a comparison of the second annotation with the annotation criteria data;

determining a priority level of the second error; and determining the priority level of the first error is greater than the priority level of the second error, wherein routing the annotation to the particular destination comprises routing the first annotation to the particular destination based at least in part on determining the priority level of the first error is greater than the priority level of the second error.

5. The method of claim 1, wherein the annotation is a first annotation, the error is a first error, and the object is a first object, wherein the first portion of the annotated image data comprises a second annotation associated with at least one of the first object or a second object within the image, the method further comprising:

determining a second error associated with the first portion of the annotated image data based at least in part on a comparison of the second annotation with the annotation criteria data;

determining a priority level of the second error; and routing the second annotation based at least in part on determining the priority level of the second error.

6. The method of claim 1, wherein the object is associated with additional data, wherein the additional data comprises a three-dimensional box, a two-dimensional box, a two-dimensional mask, a lidar segmentation, or a map.

7. The method of claim 1, further comprising causing display, of a plurality of errors identified in the annotated image data and a location of the plurality of errors within the image.

8. The method of claim 1, wherein the annotated image data is first annotated image data and the annotation is a first annotation, the method further comprising:

receiving the image; and generating, using a trained neural network, second annotated image data associated with the image, wherein the second annotated image data comprises a second annotation associated with the object, wherein the annotation criteria data comprises the second annotated image data, wherein determining the error comprises determining the error based at least in part on a comparison of the first annotation with the second annotation.

9. The method of claim 8, wherein determining the error comprises determining that the first annotation is different from the second annotation.

10. The method of claim 9, wherein the first annotation indicates a first object type for the object and the second annotation indicates a second object type for the object.

11. The method of claim 1, wherein the annotation criteria data comprises an annotation criterion, wherein determining the error comprises determining the annotation does not satisfy the annotation criterion.

12. The method of claim 11, wherein determining the annotation does not satisfy the annotation criterion comprises determining that the annotation overlaps with another annotation of another object.

13. The method of claim 11, wherein determining the annotation does not satisfy the annotation criterion comprises determining that the annotation is not valid or is empty.

14. The method of claim 11, wherein determining the annotation does not satisfy the annotation criterion comprises determining that the object is located in a particular region of the image.

15. The method of claim 11, wherein determining the annotation does not satisfy the annotation criterion comprises determining that a location within the image of the object satisfies a distance threshold relative to a location of the object within at least one other image.

16. The method of claim 11, wherein determining the annotation does not satisfy the annotation criterion comprises determining that a movement of the object between the image and at least one other image satisfies an object movement threshold.

17. The method of claim 11, wherein determining the annotation does not satisfy the annotation criterion comprises determining that at least one of a size or shape of the object satisfies at least one of a size threshold or shape threshold, respectively.

18. The method of claim 11, wherein the annotated image data is first annotated image data, the image is a first image, and the annotation is a first annotation, the method further comprising:

receiving second annotated image data associated with a second image, wherein the second annotated image data comprises a second annotation associated with the object in the second image, wherein determining the first annotation does not satisfy the annotation criterion comprises determining that the first annotation is different from the second annotation.

19. A system, comprising:

at least one processor, and at least one non-transitory storage media storing instructions that, when executed by the at least one processor, cause the at least one processor to:

receive annotated image data associated with an image, wherein a first portion of the annotated image data comprises an annotation associated with an object within the image;

determine an error associated with the first portion of the annotated image data based at least in part on a comparison of the annotation with annotation criteria data associated with criteria for at least one annotation;

determine a priority level of the error;

identify a particular destination for the annotation from a plurality of destinations based at least in part on the priority level of the error, wherein a first destination of the plurality of destinations is associated with a computing device, wherein a second destination of the plurality of destinations is associated with training of a neural network for autonomous driving, wherein each of the plurality of destinations is associated with a respective priority level of a plurality of priority levels of errors; and route the annotation to the particular destination, wherein the neural network is trained using a second portion of the annotated image data based at least in part on determining the error.

20. At least one non-transitory storage media storing instructions that, when executed by a computing system comprising a processor, cause the computing system to:

receive annotated image data associated with an image, wherein a first portion of the annotated image data comprises an annotation associated with an object within the image;

determine an error associated with the first portion of the annotated image data based at least in part on a comparison of the annotation with annotation criteria data associated with criteria for at least one annotation;
determine a priority level of the error;
identify a particular destination for the annotation from a plurality of destinations based at least in part on the priority level of the error, wherein a first destination of the plurality of destinations is associated with a computing device, wherein a second destination of the plurality of destinations is associated with training of a neural network for autonomous driving, wherein each of the plurality of destinations is associated with a respective priority level of a plurality of priority levels of errors; and
route the annotation to the particular destination, wherein the neural network is trained using a second portion of the annotated image data based at least in part on determining the error.

* * * * *